United States Patent [19]

van der Does

[11] 4,040,614
[45] Aug. 9, 1977

[54] SEPARATOR DEVICE

[75] Inventor: Lucas van der Does, Oenkerk, Netherlands

[73] Assignee: N. V. Optische Industrie "De Oude Delft", Netherlands

[21] Appl. No.: 623,941

[22] Filed: Oct. 20, 1975

[30] Foreign Application Priority Data

Oct. 24, 1974 Netherlands .......................... 7413932

[51] Int. Cl.² ............................................. B65H 3/50
[52] U.S. Cl. .................................................. 271/19
[58] Field of Search ....................... 271/16, 17, 19, 21, 271/22, 24, 25

[56] References Cited

U.S. PATENT DOCUMENTS

| 528,918 | 11/1894 | Bradshaw | 271/21 |
| 1,559,549 | 11/1925 | Bullock | 271/21 |
| 3,743,276 | 7/1973 | van der Does | 271/24 |
| 3,866,828 | 2/1975 | Young | 271/21 |

Primary Examiner—Robert W. Saifer
Attorney, Agent, or Firm—Marn & Jangarathis

[57] ABSTRACT

There is disclosed a separator device for singularly passing to a transport member a rectangular sheet of material from a stack of such sheets accommodated in a storage cassette having a rectangular slotted sheet discharge opening. The cassette is provided with a hold-down plate for pressing the uppermost sheet against a bulge forming means disposed adjacent the discharge opening and comprised of a pushing member. The bulge forming means is controlled by a first cam disc adapted to perform a reciprocating movement to engage the leading edge of the uppermost sheet whereby such sheet is partly released from the stack by bulging at the discharge opening. Adjacent the bulging produced on one side edge of the sheet there is disposed a catching means comprised of a hook and controlled by a second cam disc adapted to lift the leading portion of the uppermost sheet such that after release of the uppermost sheet by said catching means, the sheet is caused to lie on a sheet guide means whereby transport rollers can further move the sheet. A third cam disc is provided to impart a reciprocating movement to the sheet guide means having a receding leading edge relative to the storage cassette proximate to the pushing member.

5 Claims, 7 Drawing Figures

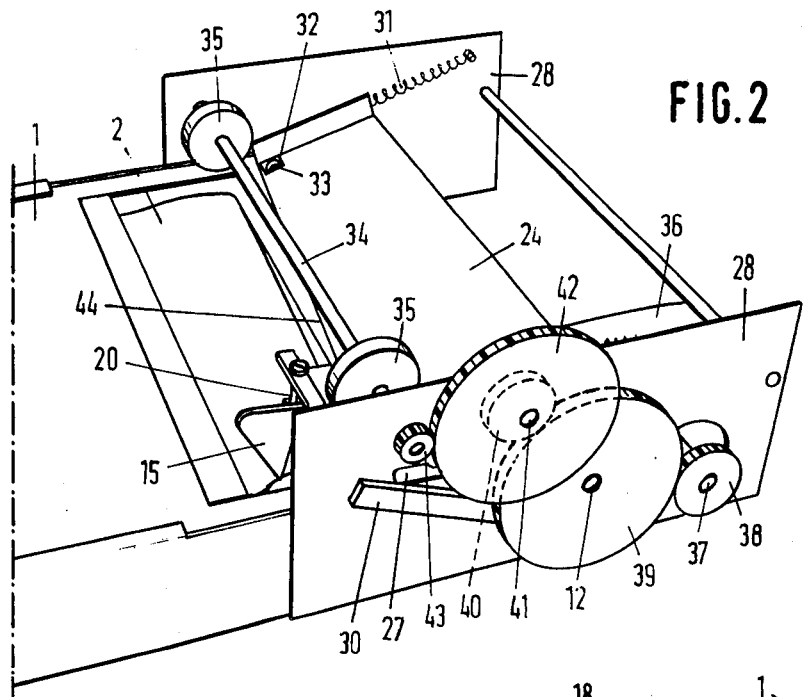
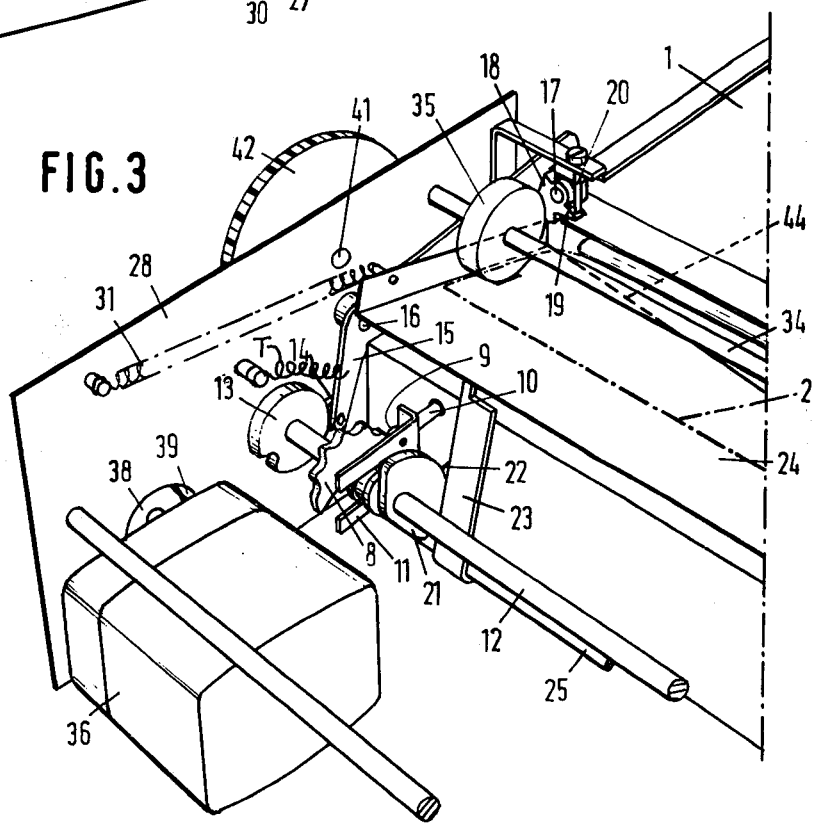

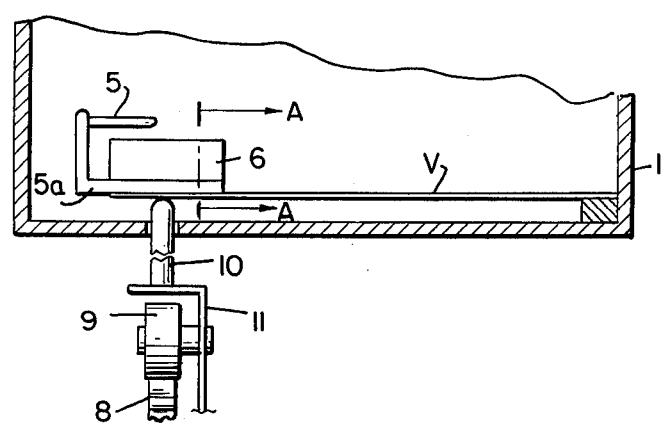
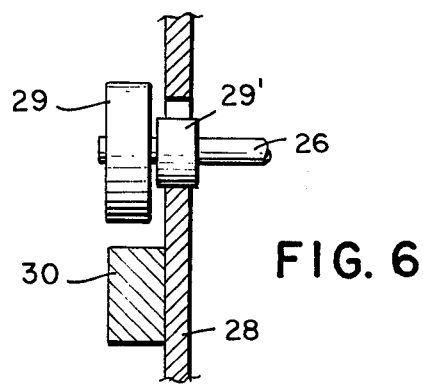
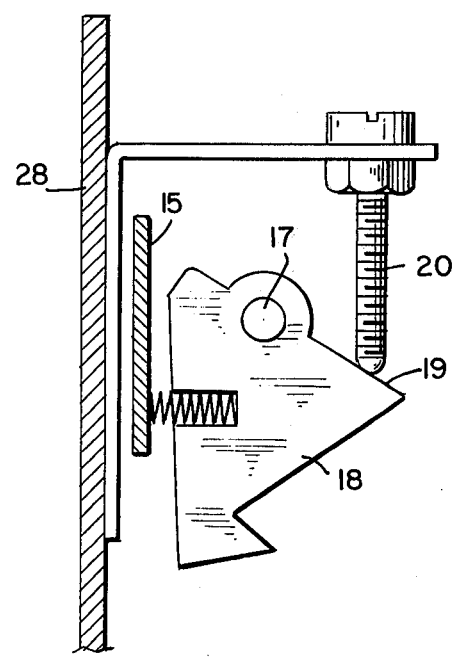

SEPARATOR DEVICE

The present invention relates to a separator device for moving piece by piece rectangular sheets, such as film sheets, from a stack to a transport member, the stack being accommodated in a storage cassette having a rectangular, slotted sheet discharge opening and a holddown plate for pressing the upper sheet of the stack, under spring force, against bulge forming means disposed adjacent the discharge opening, said bulge forming means controlled by a first cam disc being adapted to perform a reciprocating movement and engage the leading edge of the upper sheet, which sheet can thus at least partly be released from the stack by bulging at the discharge opening, there being disposed catching means controlled by a second cam disc adjacent a bulging produced on one side edge of the sheet, said catching means being adapted to lift the leading portion of the sheet such that this portion, after release of the sheet by said catching means, comes to lie on a sheet guide means where transport rollers can discharge the sheet. Such apparatus is known from U.S. Pat. No. 3,743,276. The apparatus disclosed therein is provided with pushing means engaging the leading edge of the upper sheet in proximity to the corners thereof, which means are adapted to push the leading edge of the sheet backwards, thus producing on both side edges bulgings whereunder the hook-shaped catching means can engage which catching means lift the leading portion of the sheet. The sheet is further bent until the leading edge emerges from the cassette and is drawn to above the leading edge of the stationary sheet guide means. The remaining tension in the sheet applied by the pushing and hook members ensures that the sheet, upon the release by the hooks, slips underneath the transport rollers so that they are capable of discharging the sheet. A drawback of this apparatus is that one sheet can be bulged by the one pushing member and e.g. two sheets by the other. The one hook then lifts one sheet and the other e.g. two. It is clear that disturbances are bound to occur in that a second sheet arrives halfway above and halfway underneath the sheet guide means so that the sheet discharge could be hampered.

During the bulging and lifting of a film sheet it is moreover possible that about in the middle of the sheet there is produced a fold or crease resulting in vague and black spots on the developed film. Furthermore the release of the film sheet by both hooks should be effected exactly at the same time, since otherwise the film sheet would slip away obliquely towards the sheet guide means, thus being transported earlier by the one than by the other roller, with all adverse effects going therewith, such as assuming an oblique position, creasing and the like. Also, after the release by the hooks, the displacement of the sheet to between the two transport rollers solely depends on the resilience of the sheet. This resilience does not only depend on the material employed and the nominal thickness of the sheet but moreover may vary in a sheet from place to place. Besides the sheet, after release by the hooks, may slip away instead of between the transport rollers, underneath the lowermost rollers, which again will result in disturbances and damage to the sheets.

To prevent the above drawbacks, an apparatus of the above type according to the invention is so designed that the bulge forming means and the catching means comprise pushing means disposed on one side adjacent a corner of the leading edge of the sheet discharge opening and a hook, respectively, and that at least a third cam disc imparts a reciprocating movement to the sheet guide means, said means having a receding leading edge relative to the storage cassette from the side where the pushing means are disposed.

As a result of this embodiment the resilience of the sheet is used to a lesser extent. After the topmost sheet has been bulged at one side, the hook engages underneath said bulging, withdrawing the sheet from the casette. During the bulging the sheet guide means is moved in its hindmost position, the leading edge thereof being farthest removed from the leading edge of the sheet. After the withdrawal of the sheet from the cassette, the sheet guide means is moved forward and the hook releases the sheet so that the lifted corner of the sheet falls on the sheet guide means, whereby the leading edge of the sheet is pushed entirely on the sheet guide means through the advancing movement of the sheet guide means over the receding leading edge. Thereby use is no longer made of the resilience of the sheet to "spring" it onto the sheet guide means and underneath the transport rollers. A particular effect is yet that the lifting height of the hook is reduced so that the transport speed can be increased. This lifting height reduction of the hook is possible in that this needs only to withdraw the foremost portion of the sheet from underneath the pushing member and lifting a corner of the sheet to above the sheet guide means, there being no need any longer to lift the leading portion of the sheet to above the guide means and between the transport rollers. At the same time the drawbacks going with the bilateral engagement of the sheet have all been eliminated.

To ensure that the transport on the sheet guide means is effected properly, and that no oblique positioning or creasing is produced, it is recommendable according to another embodiment of the invention that the sheet guide means adjacent the leading edge is provided with a shaft connected thereto, whereon are mounted rollers guided in slots in the sidewalls, the slots at the front side being enlarged in vertical direction, there being disposed at the outer side of the rollers guided in said slots, wheels that have a larger diameter than the rollers and being adapted to coact, in the region of the slot enlargement, with the top side of strips disposed adjustably on the sidewalls.

According to a further advantageous embodiment the apparatus according to the invention is so designed that a pin is mounted in front of the pushing member and is fixedly connected thereto, thus accurately fixing the shape of the bulging and keeping the sheet as flat as possible relative to the pushing member.

Furthermore there may be a provision, for the proper separation of the top sheet from the stack of sheets, that the first cam disc has a partly corrugated surface. This feature, like the previous one, is very useful in the bulging of the upper sheet on one side, because the leading edge of said sheet will enclose an angle with the leading edge of the subjacent sheets during bulging.

One embodiment of the separator device according to the invention will now be described, by way of example, with reference to the accompanying drawings wherein FIG. 1 shows a perspective view of the separator device according to the invention;

FIG. 2 shows a perspective view wherein the device is turned through 90° relative to FIG. 1;

FIG. 3 is a perspective view of part of the apparatus according to the invention on an enlarged scale;

FIG. 4 is a partial elevational viw of the separator device;

FIG. 5 is a sectional view taken along the lines A-A of FIG. 4;

FIG. 6 is a partial sectional view taken along the lines B-B of FIG. 1; and

FIG. 7 is a sectional view of the hook.

Figure 1:
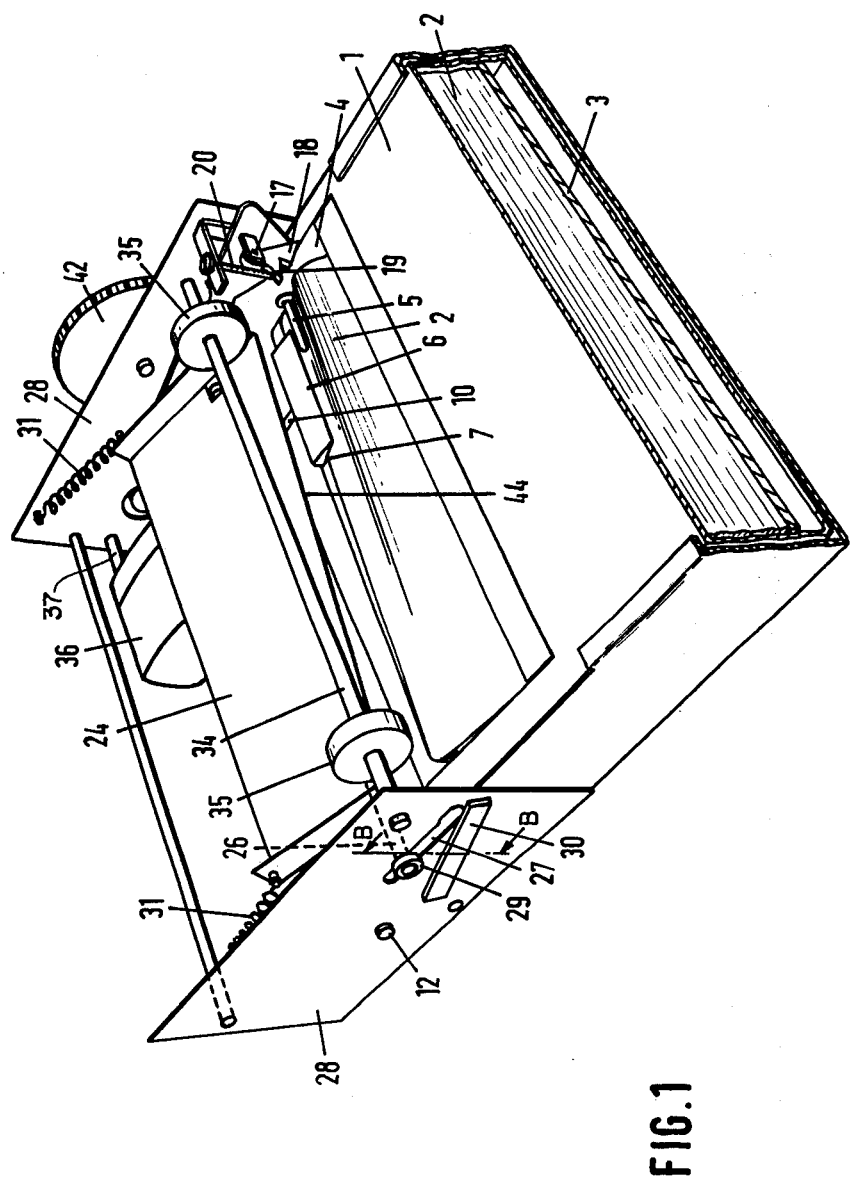

The apparatus shown in the drawings comprises a separator portion and a sheet take-up portion. The latter is so designed that a storage casette 1 with sheets 2 can be inserted therein and arrested. The stack of sheets 2 lies on a hold-down plate 3 which is so loaded through springs that the upper sheet of the stack is always pressed against the top side of the casette 1. The top side is provided with a slotted discharge opening 4, which is slightly broader than the width of a sheet. Adjacent to the leading edge of said discharge opening 4, the stack of sheets is pressed by the hold-down plate 3 on one side both against a pin 5 and a pushing member 6. Said member 6 is fitted at the bottom side with a projecting edge 7 which is adapted to engage the leading edge of the top sheet and which projects slightly less than the thickness of a sheet, while the pushing member is so attached in the cassette as to perform a reciprocating movement together with the pin 5 fixedly connected therewith.

The pushing member 6 is controlled by a cam disc 8 disposed in the separator portion of the device, which disc, via a spring-loaded cam 9 effected by spring V and a tappet rod 10 fixedly connected therewith, is adapted to impart a reciprocating movement to the pushing member 6. A guide means 11 ensures that said tappet rod 10 can only perform a translating motion.

The cam disc 8 is mounted on a shaft 12 whereon there is likewise mounted a cam disc 13 which operates, through a spring-loaded cam 14 under the influence of spring T, a rocker member 15 adapted for rotation about a shaft 16. At the end of rocker member 15, opposite cam disc 13, there is disposed a hook 18 pivotal about a shaft 17, the centerline of shaft 17 being perpendicular to that of shaft 16. The hook 18 has an impact surface 19 coacting with a pin 20 and loaded by a spring always pushing the impact surface 19 in the direction of the pin 20. Said pin 20 is so disposed that, when the rocker member 15 is in its upper position, the pin 20 contacts the impact surface 19, turning the hook 18 against the spring force.

On the shaft 12 there are furthermore mounted two cam discs 21 which each control a sheet guide member 24 through a cam 22 and a lever 23 fixedly connected therewith, there being mounted adjacent the side edge of member 24 a cam disc 21, a cam 22 and a lever 23. Because the lever 23 is journalled at its lower side on a shaft 25 and at its upper side on the sheet guide member 24, said lever 23 can perform a pivoting movement, thus moving sheet guide member 24. To control said movement, there is mounted, adjacent the leading edge of the sheet guide member 24, a shaft 26 fixedly connected therewith and having rollers adapted for free rotation thereon. Said rollers are passed through slots 27 in the sidewalls 28 of the separator portion. Beside the rollers there are disposed at the outer side of the sidewalls 28 freely rotatable wheels 29, while the slots 27 are upwardly broadened at their end facing the storage cassette 1. Furthermore there is disposed on each sidewall 28 an adjustable strip 30 whose top surface can be contacted with a wheel 29 so that shaft 26 and thereby the leading portion of the sheet guide member 24 attached thereto can also be slightly lifted at the end of its forward movement. To ensure that the cams 22 continue to follow cam discs 21, the sheet guide member is always drawn by means of two tension springs 31, in the direction of the cam disc 21.

In the sheet guide member 24, adjacent the shaft 26, and on either side, there are disposed recesses 32 through which projects part of the contour of freely rotatable rollers 33 mounted on shaft 26. Said rollers 33 ensure, together with a set of rollers 35 fixedly mounted on a shaft 34, the transport of a sheet 2 emerging from the cassette. To this effect the rollers 33 and 35 are so disposed relative to each other that their jacket surfaces make contact when the sheet guide member 24 is in its fore most position.

The various elements of the apparatus are all driven by an electric motor 36, on the output shaft 37 of which there is a gear 38 coacting with a gear 39 on a shaft 12 whereon are mounted cams discs 13,8 and 21. The gear 39 also coacts with a gear 40 on shaft 41 whereon is mounted a second gear 42. The gear 42 again coacts with a gear 43 on shaft 34, thus driving rollers 35.

The device functions as follows.

After the storage cassette 1 has been inserted in the sheet take-up portion, the top sheet 2 lies against the projecting edge 7 of the pushing member 6 and underneath the pin 5. The sheet guide member 24 is in its forward position and the rocking member 15 in its upper position.

When the electric motor 36 is switched on, the cam disc 8 will rotate and move the tappet rod 10 in the direction of the cassette 1, so that the pushing member on one side pushes the leading edge of the top sheet 2 backwards. Since the sheet cannot be pushed backwards in its entirety and is pressed by the hold-down plate 3 against the top wall of the cassette, the sheet 2 on one side will bulge between the trailing edge of the slot 4 and the pin 5 moved together with the pushing member 6, as shown in FIG. 1. To prevent a second sheet 2 from being pushed back together with the top sheet, it is recommendable to move the pushing member 6 vibratingly in its advancing direction. This can be attained by corrugating part of the jacket surface of the cam disc 8. Together with the forward movement of the pushing member 6 by the cam disc 8, it is effected through cam disc 21 that the sheet guide member 24 arrives in its rearmost position.

When the pushing member 6 has reached its foremost position and consequently the bulging of the sheet 2 between pin 5 and slot trailing edge is maximal, the cam disc 13 ensures that the rocking member 15 starts rotating about shaft 16, thus downwardly moving the end of said rocking member 15 with the hook 18, releasing the impact surface 19 from the stationary pin 20. The result is that the hook 18 starts rotating, the impact surface 19 turning upwards and the hook member occupying a locating nest underneath the sheet 2 in the bulging thereof. Subsequently, through the cam disc 13, the rocking member 15 is swiveled in opposite direction, so that the hook 18 is again lifted, thereby entraining the sheet 2 and withdrawing it from under the pin 5. During said lifting of the hook 18 the impact surface 19 comes into contact at a given moment with pin 20, so that the hook 18 starts turning about shaft 17 and the hook member is turned away from underneath the sheet 2. Simultaneously with the lifting of the sheet 2, the cam 21 effects that the sheet guide member 24 starts moving forwardly, so that the leading portion of the sheet 2 arrives on the sheet guide member 24 when it is released by the hook 18. To ensure a smooth sliding on the sheet guide member 24 of the sheet 2 withdrawn from the cassette 1, the leading edge 44 of the sheet guide member 24 has a receding configuration from the side where the hook 18 is present. As a result the lifted point of the sheet 2 falls on the sheet guide member and, as a result of the further advancing movement of said member, gradually the entire leading portion of the sheet 2 is pushed on the sheet guide member 24. The member 24 is so far advanced that the leading edge of the sheet 2 comes to lie between the rollers 33 and 35. In the foremost position of the sheet guide member 24 the rollers 33 are moved by means of strips 30 and wheels 29 towards rollers 35, so that the sheet 2 clamped between the rollers 33 and 35 is discharged.

I claim:
1. A separator device including side walls for singularly moving a rectangular sheet such as a film sheet from a stack of sheets to a transport member, said stack being accommodated in a storage cassette having a rectangular, slotted sheet discharge opening and a hold-down plate for maintaining the uppermost sheet of said stack against a bulge forming means disposed adjacent the discharge opening, said bulge forming means controlled by a first cam disc adapted to perform a reciprocating movement to engage the leading edge of said uppermost sheet of said stack, said uppermost sheet being at least partly released from said stack by forming a bulge at said discharge opening, and wherein there is disposed catching means controlled by a second cam disc proximate to said bulge of said uppermost sheet, said catching means being adapted to lift said leading edge of said uppermost sheet, whereby after release of said uppermost sheet by said catching means said uppermost sheet is caused to lie on a sheet guide means thereby permitting transport rollers to withdraw said uppermost sheet from said stack, characterized in that said bulge forming means and said catching means comprise a pushing element disposed adjacent a corner of said leading edge at said sheet discharge opening and a hook, respectively, and wherein there is provided a third cam disc for imparting a reciprocating movement to said sheet guide means, said guide means having a receding leading edge relative to said storage cassette proximate to said pushing means.

2. The apparatus as defined in claim 1 characterized in that said sheet guide means is provided adjacent the leading edge thereof with a shaft on which are mounted rollers, said shaft extending through slots formed in said sidewalls.

3. The apparatus as defined in claim 2 wherein said slots are enlarged in vertical direction at an end proximate to said cassette and wherein said shaft is provided with wheels outside of said sidewalls, said wheels having a larger diameter than said rollers and wherein there is provided strips adjustably disposed on said sidewalls in the region of the slot enlargement to permit said wheels to coact with an upper side of said strips.

4. The apparatus as defined in claim 1 including a pin mounted in front of and to said pushing member.

5. The apparatus as defined in claim 1 wherein said first cam disc has a partly corrugated surface.

* * * * *